United States Patent
Zhao et al.

(10) Patent No.: US 10,983,714 B2
(45) Date of Patent: Apr. 20, 2021

(54) DISTRIBUTION FROM MULTIPLE SERVERS TO MULTIPLE NODES

(71) Applicant: International Business Machines Corporation, Armonk, NY (US)

(72) Inventors: Xu Zhao, Xian (CN); Guang Ya Liu, Xian (CN); Guang Han Sui, Beijing (CN); Long Long Cao, Xian (CN); Dong Yu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/533,629

(22) Filed: Aug. 6, 2019

(65) Prior Publication Data

US 2021/0042048 A1 Feb. 11, 2021

(51) Int. Cl.
*G06F 3/06* (2006.01)
*H04L 12/919* (2013.01)

(52) U.S. Cl.
CPC ............ *G06F 3/0635* (2013.01); *G06F 3/064* (2013.01); *G06F 3/067* (2013.01); *G06F 3/0617* (2013.01); *G06F 3/0643* (2013.01); *G06F 3/0646* (2013.01); *H04L 47/765* (2013.01)

(58) Field of Classification Search
CPC ....... G06F 16/182; G06F 3/0646; G06F 3/067
See application file for complete search history.

(56) References Cited

U.S. PATENT DOCUMENTS

| | | | |
|---|---|---|---|
| 7,349,906 B2* | 3/2008 | Cherkasova | ........ H04L 67/1095 |
| 7,454,408 B2 | 11/2008 | Koffron | |
| 7,464,176 B2 | 12/2008 | Cohen et al. | |
| 8,341,285 B2 | 12/2012 | Eshwar | |
| 8,856,286 B2 | 10/2014 | Barsness | |
| 9,906,587 B2* | 2/2018 | Kim | ...................... G06F 21/445 |
| 10,162,828 B2* | 12/2018 | Foster | ............... G06F 17/30091 |

(Continued)

FOREIGN PATENT DOCUMENTS

| CN | 101631143 A | 1/2010 |
|---|---|---|
| CN | 107113290 A | 8/2017 |

(Continued)

OTHER PUBLICATIONS

List of IBM Patents or Patent Applications Treated as Related, Aug. 6, 2019, 2 pgs.

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Edward J Dudek, Jr.
(74) *Attorney, Agent, or Firm* — Peter K. Suchecki

(57) ABSTRACT

The embodiments of the present disclosure disclose a computer-implemented method, a system, and a computer program product for distributing data on multiple servers to multiple nodes in a cluster. In the method, each of M servers is instructed to divide data thereon into N data segments. M and N are integers greater than one. The M servers are instructed to send N×M data segments on the M servers to N nodes in a cluster concurrently. For each of the M servers, the N data segments are sent respectively to the N nodes. When any given node in the cluster receives a data piece of a data segment from a server of the M servers, the given node is instructed to transmit the received data piece to remaining nodes in the cluster other than the given node.

20 Claims, 6 Drawing Sheets

(56) References Cited

U.S. PATENT DOCUMENTS

| | | | |
|---|---|---|---|
| 2004/0088380 A1* | 5/2004 | Chung | H04N 21/23116 |
| | | | 709/219 |
| 2005/0015404 A1* | 1/2005 | Cherkasova | H04L 67/1095 |
| 2007/0113036 A1 | 5/2007 | Gal-Oz | |
| 2009/0187674 A1 | 7/2009 | Lee et al. | |
| 2012/0233293 A1 | 9/2012 | Barton et al. | |
| 2012/0311099 A1* | 12/2012 | Yoshida | G06F 16/1837 |
| | | | 709/219 |
| 2013/0304816 A1 | 11/2013 | Reguna et al. | |
| 2013/0325895 A1 | 12/2013 | Peters et al. | |
| 2016/0154963 A1 | 6/2016 | Kumar et al. | |
| 2016/0179642 A1 | 6/2016 | Cai | |
| 2016/0253119 A1 | 9/2016 | Reynolds | |
| 2016/0357450 A1 | 12/2016 | Rao et al. | |
| 2018/0255138 A1 | 9/2018 | Hall | |
| 2019/0036648 A1 | 1/2019 | Yanovsky et al. | |

FOREIGN PATENT DOCUMENTS

| | | | | |
|---|---|---|---|---|
| CN | 105099946 B | | 9/2018 | |
| KR | 20060065239 | * | 6/2006 | H04L 12/2838 |

OTHER PUBLICATIONS

Sinha, "Data Transfer Nodes for Cloud-Storage Providers," https://pdfs.semanticscholar.org/a94c/da121ff8f8bba45cb37bde332bf48ffac7e3.pdf, pp. 1-77, © 2016 Soham Sinha.

Sui et al., "Method for Increasing File Transmission Speed," U.S. Appl. No. 16/193,031, filed Nov. 16, 2018.

Unknown, "Scale-Out File Server for application data overview," https://docs.microsoft.com/en-us/windows-server/failover-clustering/sofs-overview, Apr. 26, 2018, 8 pgs.

* cited by examiner

DISTRIBUTION FROM MULTIPLE SERVERS TO MULTIPLE NODES

BACKGROUND

The present invention relates to the field of computer networks, and more specifically, to a computer-implemented method, a system and a computer program product for distributing data on multiple servers to multiple nodes in a cluster.

In a large scale cluster environment, an incremental deployment technique may be used to deploy a cluster from multiple servers. The incremental deployment technique is a technique from which a large scale cluster is deployed from a small scale step by step. In the large scale cluster environment, data of large size, such as configuration files and images, may be distributed from multiple servers to multiple nodes in the cluster, such that each node has a completed copy of data on each server.

SUMMARY

According to one embodiment of the present invention, a computer-implemented method is provided. In the method, each of M servers is instructed to divide data thereon into N data segments. M and N are integers greater than one. The M servers are instructed to send N×M data segments on the M servers to N nodes in a cluster concurrently. For each of the M servers, the N data segments are sent respectively to the N nodes. When any given node in the cluster receives a data piece of a data segment from a server of the M servers, the given node is instructed to transmit the received data piece to remaining nodes in the cluster other than the given node.

According to another embodiment of the present invention, A system is provided. The system includes M servers, N nodes in a cluster, one or more processors coupled to the M servers and the N nodes, a memory coupled to the one or more processors, and a set of computer program instructions stored in the memory and executed by the one or more processors to implement the method according to the one embodiment of the present invention as described above. Here, M and N are integers greater than one.

According to still another embodiment of the present disclosure, there is provided a computer program product. The computer program product comprises a computer readable storage medium having program instructions embodied therewith. The program instructions are executable by one or more processors to implement the method according to the one embodiment of the present disclosure as described above.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
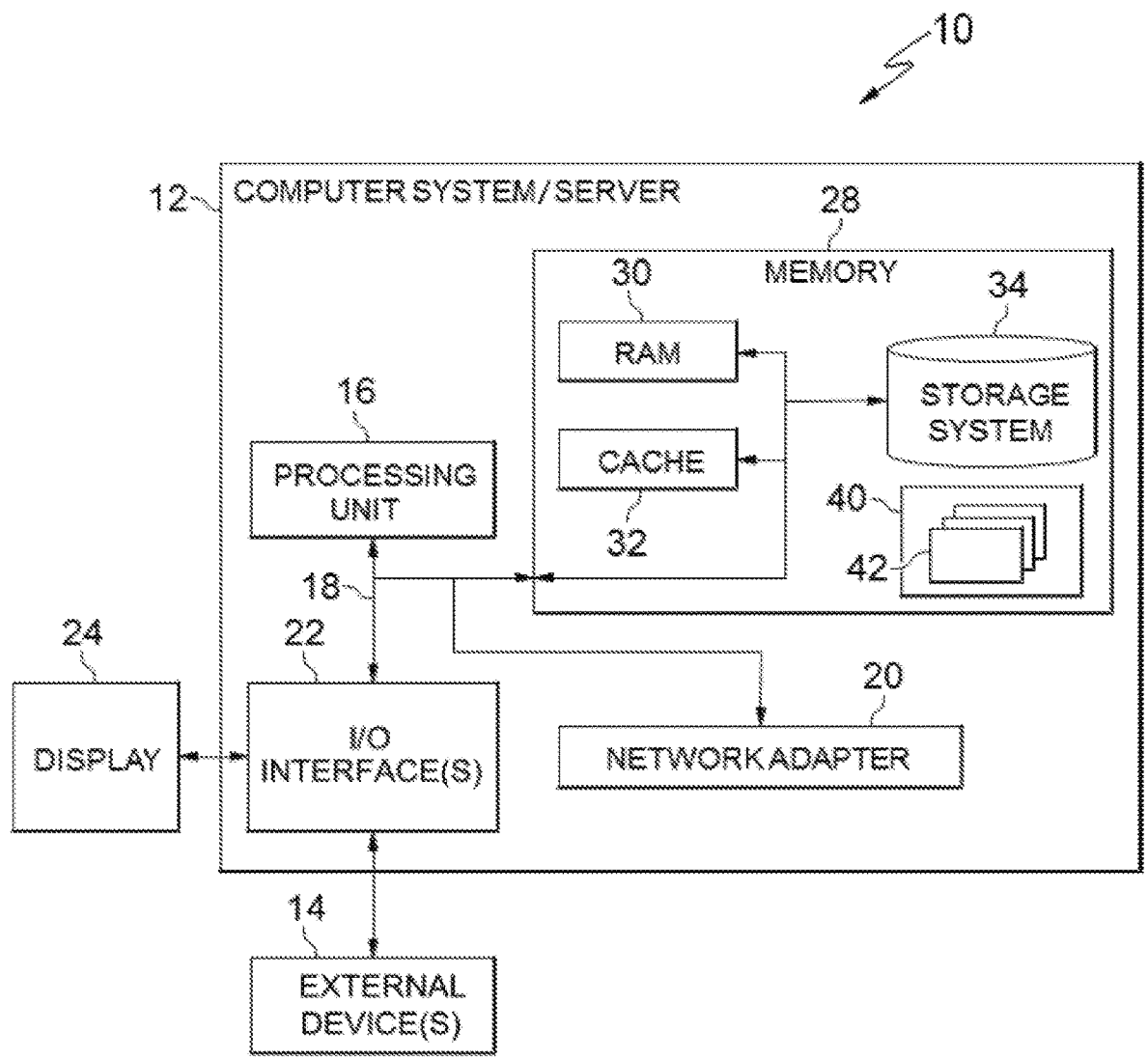
FIG. 1 depicts a cloud computing node according to an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of computer networks, and more particularly to a computer-implemented method, a system and a computer program product for distributing data on multiple servers to multiple nodes in a cluster. While the present disclosure is not necessarily limited to such applications, various aspects of the disclosure may be appreciated through a discussion of various examples using this context.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
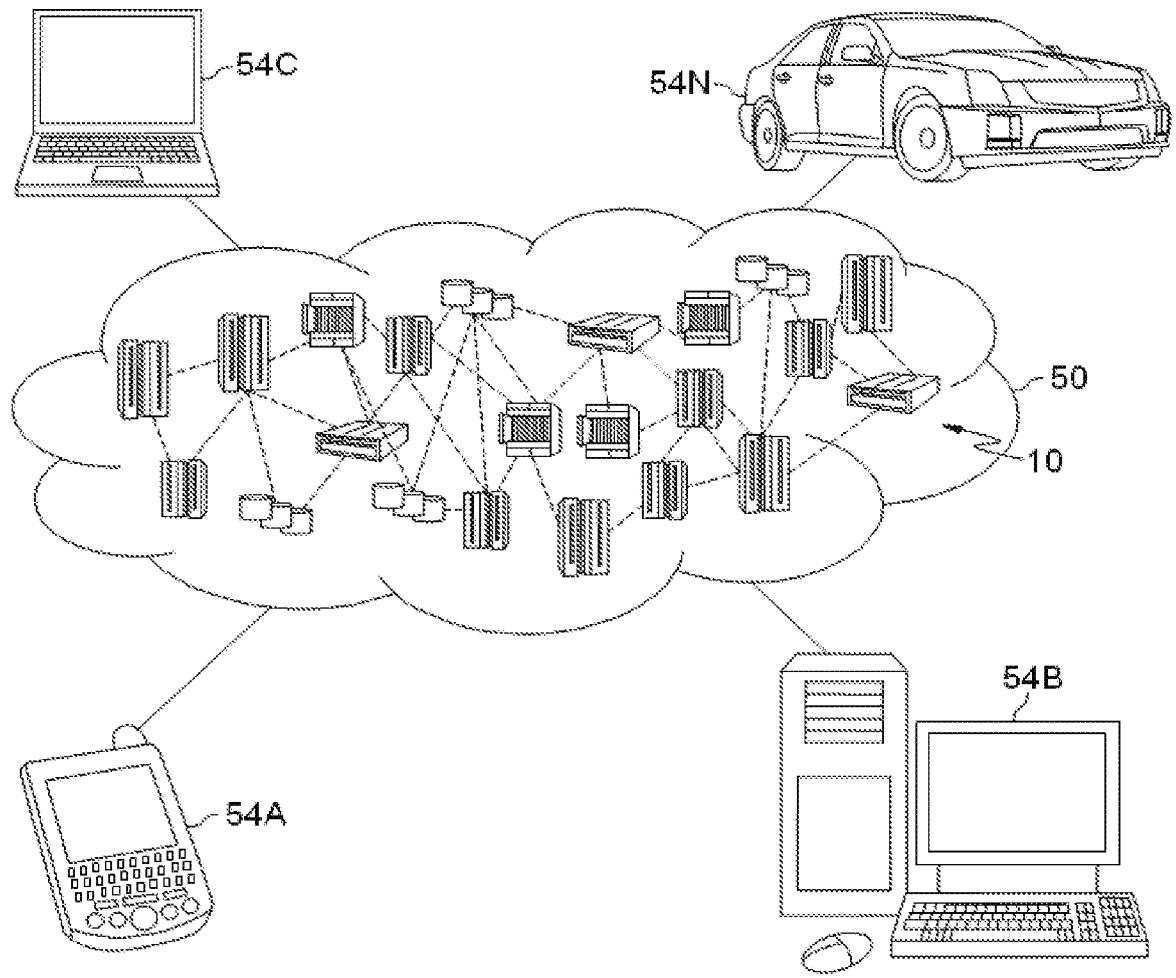
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
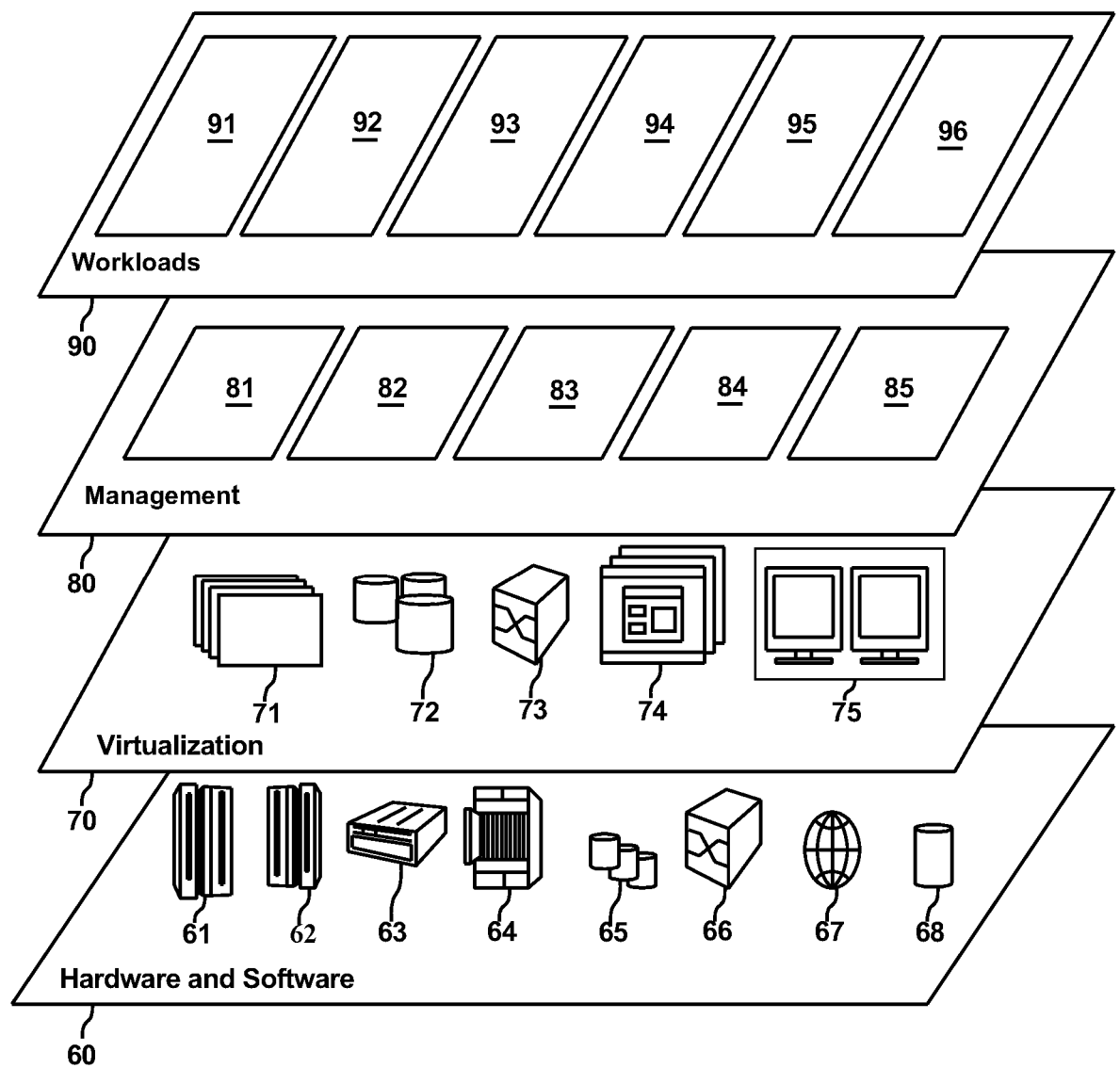
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data distribution 96.

Figure 4:
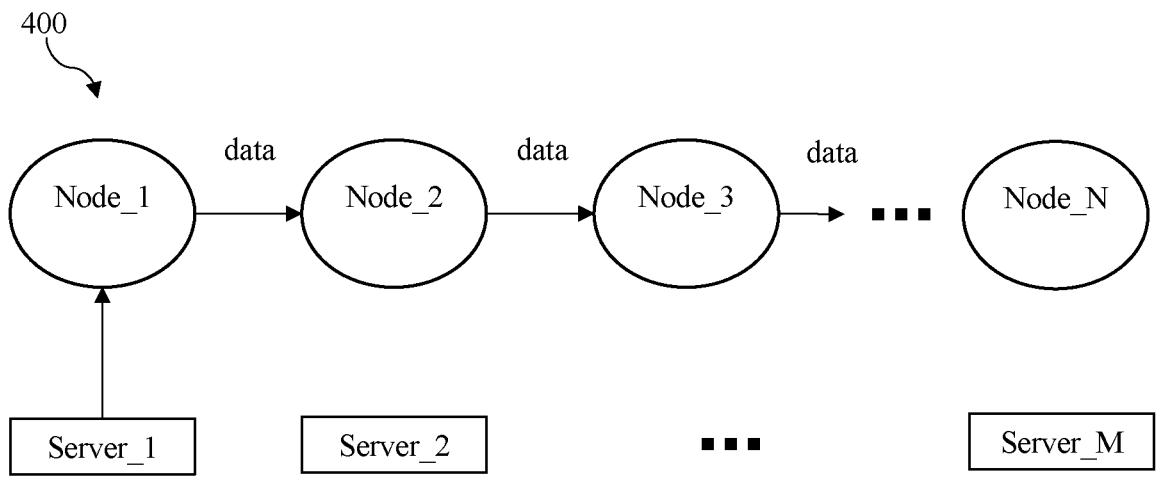
FIG. 4 depicts an example schematic diagram of distributing data from multiple servers to multiple nodes in a cluster, in accordance with embodiments of the present disclosure.

Referring now to FIG. 4, shown is an example schematic diagram of distributing data from multiple servers to multiple nodes in a cluster 400, in accordance with embodiments of the present disclosure. Generally, in the large scale cluster environment, data on multiple servers may be distributed to multiple nodes using a technique similar to Hadoop Distributed File System (HDFS). In the illustrated embodiment, the data distributed from the servers to the nodes in the cluster is shown using HDFS. As shown in FIG. 4, all nodes may be arranged like a queue. A server Server_1 may send data to a node Node_1 and the node Node_1 may synchronize data to a next node Node_2. Then the node Node_2 may synchronize data to a next node Node_3. In FIG. 4, the solid arrows illustrate the directions of data flow. The process may repeat itself sequentially until each of the nodes, Node_1 to Node_N, in the cluster receive a copy of data on the server Server_1. Then, the sequential servers, Server_2 to Server_M, may repeat the aforementioned process one by one, until all the nodes, Node_1 to Node_N, in the cluster replicate data on all the servers, Server_1 to Server_M.

In the actual application environment, the bandwidth of an individual server may be generally larger than the bandwidth of each node. The downloading bandwidth from the server to the node may be limited to the node bandwidth. Therefore, the server bandwidth may be not fully used. In addition, since the servers download data to the node Node_1 one by one, the servers are occupied by a period of time equal to the total size of data on all the servers divided by the node bandwidth. This results in a bottleneck of distributing speed.

Figure 5:
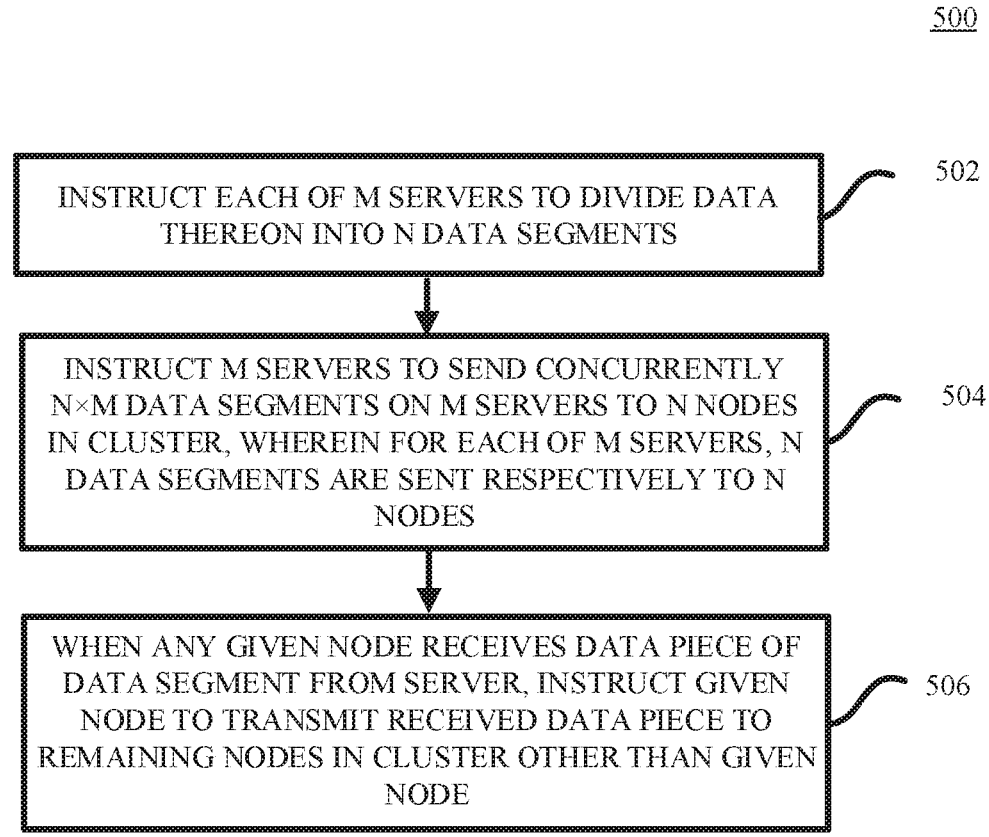
FIG. 5 depicts a schematic flowchart of an example method for distributing data on multiple servers to multiple nodes in a cluster, in accordance with embodiments of the present disclosure.
Figure 6:
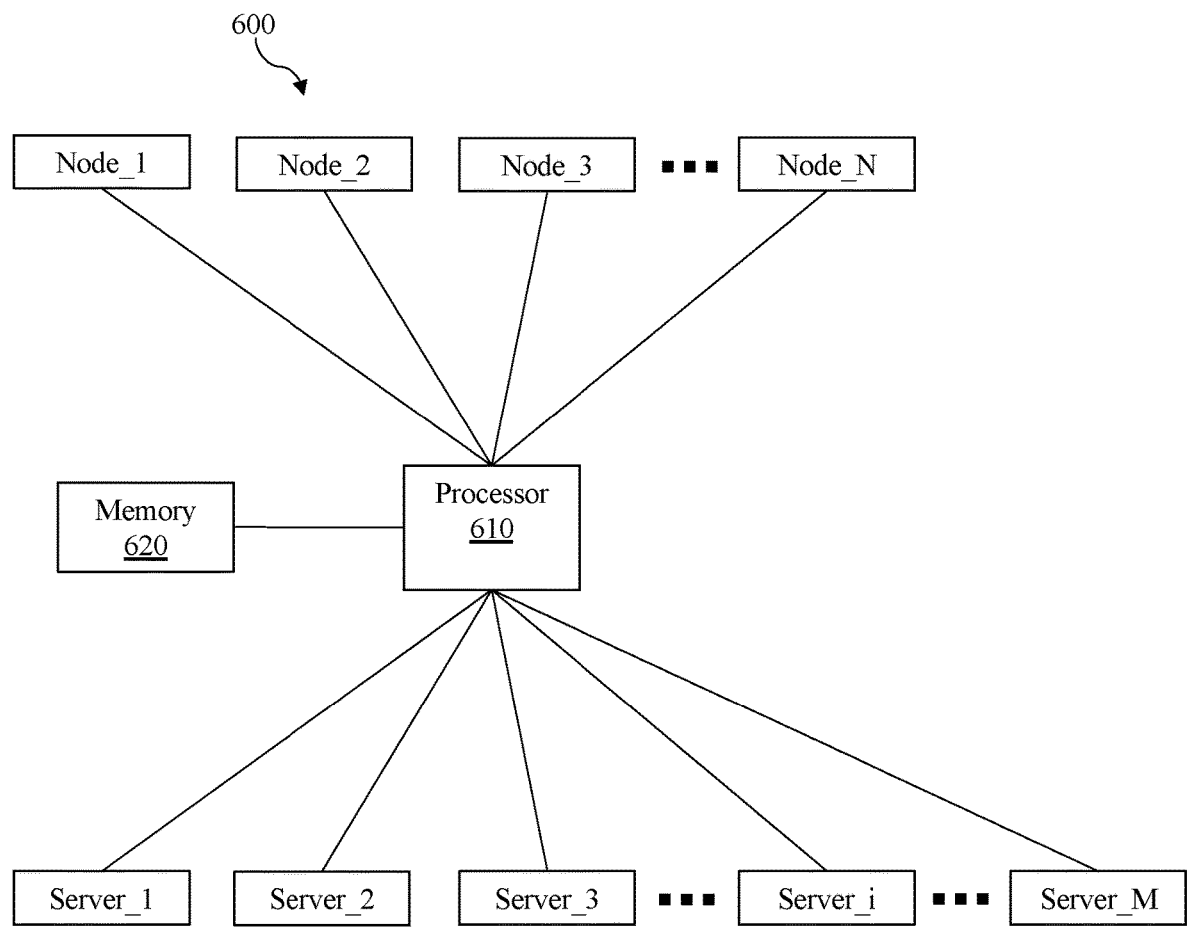
FIG. 6 depicts an example schematic diagram of a system for distributing data from multiple servers to multiple nodes in a cluster, in accordance with embodiments of the present disclosure.

With reference now to FIG. 5, shown is a schematic flowchart of an example method 500 for distributing data on multiple servers to multiple nodes in a cluster, in accordance with embodiments of the present disclosure. FIG. 6 shows an example schematic diagram of a system 600 in which the method 500 of FIG. 5 may be implemented, in accordance with embodiments of the present disclosure. As shown in FIG. 6, the system 600 may include M servers, Server_1 to Server_M, N nodes, Node_1 to Node_N, in a cluster, a processor 610 coupled to the M servers and the N nodes, and a memory 620 coupled to the processor 610. M and N are integers greater than one. The processor 610 may represent one or more processors in the following description, which may be used to execute operations of the method 500. The processor 610 and the memory 620 may be embodied in e.g., a management server.

In the illustrated embodiment of FIG. 6, the node bandwidths of the N nodes, Node_1 to Node_N, in the cluster may be the same, each of which is represented by X hereinafter. The receiving bandwidth and transmitting bandwidth of each node, Node_1 to Node_N, are both X. In this context, the node bandwidth refers to the receiving bandwidth of the node. The server bandwidths of the M servers may be different, which are used for distributing data of different sizes. In order to make the expression simple, it is assumed that all of the data on the M servers, Server_1 to Server_M, is intended to be distributed to the N nodes, Node_1 to Node_N. In the following description, the server bandwidth of the server Server_1 is represented by B1, and the size of data on the server Server_1 is represented by Z. The server bandwidth of the server Server_2 is represented by B2, and the size of data on the server Server_2 is represented by Z2. In this way, the server bandwidth of the server Server_i is represented by Bi, and the size of data on the server Server_i is represented by Zi. Here, "i" may represent any integer from 1 to M. The server bandwidth of the server Server_M is represented by BM, and the size of data on the server Server_M is represented by ZM.

Figure 7:
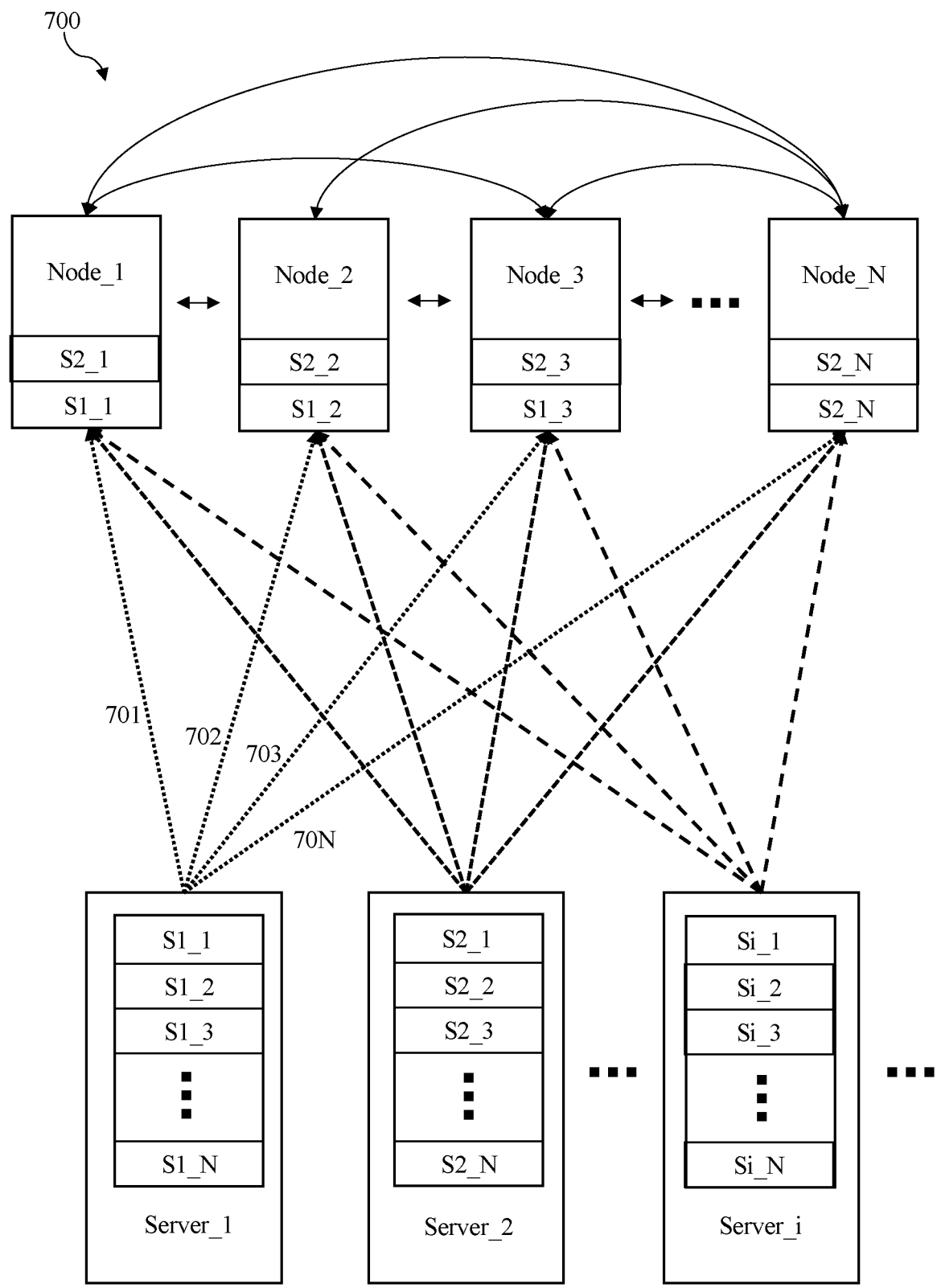
FIG. 7 depicts an example schematic diagram of distributing data from multiple servers to multiple nodes in a cluster, in accordance with embodiments of the present disclosure.

Referring now to FIG. 7, shown are example data flows in FIG. 6, in accordance with embodiments of the present disclosure. In FIG. 7, the dotted arrows illustrate the directions of data flows between the servers and the nodes, and the solid arrows illustrate the directions of data flows between the nodes. It is to be noted that, for the sake of brevity, the processor 610 and memory 620 are not depicted in FIG. 7. In the following, the operations of the method 500 are described in conjunction with FIGS. 6 to 7.

Referring back to FIG. 5, at block 502, data on each of the M servers may be divided into N data segments. The aforementioned management server may instruct the M servers to divide data thereon into N data segments. In this way, there may be N×M data segments on the M servers. In the example of FIG. 7, data on the server Server_1 may be divided into N data segments, S1_1 to S1_N, each of which may have a size Z1/N. Data on the server Server_2 may be divided into N data segments, S2_1 to S2_N, each of which may have a size Z2/N. In this way, data on the server Server_i may be divided into N data segments Si_1 to Si_N, each of which may have a size Zi/N. It is to be noted that, due to a minimum storage divisibility limit, the N data segments on the server Server_i may not have an equal size. For example, the last data segment on the server Server_i may be slightly smaller than other data segments, if Zi is not exactly divisible by N.

At block 504, the N×M data segments on the M servers may be sent to the N nodes in the cluster concurrently. For each of the M servers, the N data segment may be sent respectively to the N nodes. The aforementioned management server may instruct the M servers to send the N×M data segments to the N nodes concurrently. In the example of FIG. 7, for the server Server_1, data segment S1_1 may be sent to the node Node_1, as shown by the dotted arrow 701; data segment S1_2 may be sent to the node Node_2, as shown by the dotted arrow 702; data segment S1_3 may be sent to the node Node_3, as shown by the dotted arrow 703; and data segment S1_N may be sent to the node Node_N, as shown by the dotted arrow 70N. The data segments between S1_3 and S1_N (set of 3 bullet points) may be sent respectively to the nodes between Node_3 and Node_N in a similar manner, although they are not shown in FIG. 7. For the server Server_2, data segment S2_1 may be sent to the node Node_1; data segment S2_2 may be sent to the node Node_2; data segment S2_3 may be sent to the node Node_3; and data segment S2_N may be sent to the node Node_N. The data segments between S2_3 and S2_N may be sent respectively to the nodes between Node_3 and Node_N in a similar manner. In this way, for the server Server_i, data segment Si_1 may be sent to the node Node_1; data segment Si_2 may be sent to the node Node_2; data segment Si_3 may be sent to the node Node_3; and data segment Si_N may be sent to the node Node_N. The data segments between Si_3 and Si_N may be sent respectively to the nodes between Node_3 and Node_N in a similar manner.

In an embodiment, for each of the M servers, 1/N of its server bandwidth may be used for sending one of the N data segments to one of the N nodes. In other words, for an individual server, its server bandwidth may be divided into N sub-bandwidths. Each sub-bandwidth may be used for sending one data segment to one corresponding node. In this way, the respective sending of the N data segments on each server to the N nodes may be finished concurrently. Therefore, each server may be released in a shortest period of time.

In the example of FIG. 7, the bandwidth for sending each of the data segments, S1_1 to S1_N, on the server Server_1 may be B1/N. The bandwidth for sending each of the data segments, S2_1 to S2_N, on the server Server_2 may be B2/N. Similarly, the bandwidth for sending each of the data segments, Si_1 to Si_N, on the server Server_i may be Bi/N. Therefore, for each node, its bandwidth "BWforAllServer" for receiving data segments from the M servers may be represented by the following equation:

$$BWforAllServer = \sum_{k=1}^{M} \frac{BK}{N} \quad BWforAllServer = \sum_{k=1}^{M} \frac{Bk}{N} \tag{1}$$

The sending of the data segments, S1_1 to S1_N, S2_1 to S2_N, Si_1 to Si_N, . . . , on all the servers, Server_1 to Server_M, may be performed concurrently. Any existing or future technique for downloading data from a server to a node can be used in the embodiment. For example, the data segment may be sent in data pieces. One data piece may be embodied in one data packet. That means the data segment may be sent on a packet by packet basis.

During the process of sending the N×M data segments on the M servers to the N nodes, once any given node in the cluster receives a data piece of a data segment from a server of the M servers, the received data piece may be transmitted from the given node to remaining nodes in the cluster other than the given node, at block 506. The aforementioned management server may instruct the given node to transmit immediately the received data piece to the remaining nodes. In this context, the given node may refer to any node in the cluster. "Transmit immediately" may indicate that the transmission is performed within a shortest period of time or within a minimum amount of instruction cycles. In some embodiments, the management server may instruct the given node to transmit the received data piece to the remaining nodes within a predetermined time threshold (e.g., start transmitting within Y seconds), or the management server may just instruct the given node to transmit the data piece without setting a timeliness requirement. In some embodiments, the given node may automatically begin transmitting the received data piece to remaining nodes without receiving any instruction to do so from the management server. In the example of FIG. 7, as soon as the node Node_1 receives a data piece (a data piece of the data segment Si_1) from the server Server_i, the data piece may be transmitted immediately from the node Node_1 to the nodes, Node_2 to Node_N. As soon as the node Node_2 receives another data piece (a data piece of the data segment Si_2) from the server Server_i, the another data piece may be transmitted immediately from the node Node_2 to the nodes, Node_1 and Node_3 to Node_N.

In the embodiments of the present disclosure, the given node only transmits the data pieces directly received from the M servers to the remaining nodes. It does not transmit the data pieces received from a second node to a third node. Therefore, the algorithm for data transmission is simple. In the example of FIG. 7, take the node Node_1 as the given node as an example. The node Node_1 only transmits the data pieces directly received from the servers, Server_1 to Server_M, to the nodes, Node_2 to Node_N, as shown by the solid arrows. It does not transmit the data pieces received from, e.g., the node Node_2 to any of the nodes Node_3 to Node_N.

In an embodiment, a transmitting bandwidth allocated to transmit the received data piece from the given node to each of the remaining nodes may be the same. Therefore, the receiving bandwidth of each of the remaining nodes for receiving data piece from the given node may not be limited by the transmitting bandwidth of the given node.

In the embodiments of the present disclosure, X>BWforAllServer. Therefore, the node bandwidth is not fully used for receiving data pieces from the M servers. For each of the remaining nodes, its designated bandwidth BWforOneNode for receiving data pieces from the given node may be 1/(N−1) of a result of its node bandwidth X minus its bandwidth BWforAllServer for receiving data pieces from the M servers. Thus, the designated bandwidth BWforOneNode may be represented by the following equation:

$$BWforOneNode = \frac{X - BWforAllServer}{N-1} = \frac{X - \sum_{k=1}^{M} Bk/N}{N-1} \quad (2)$$

In the example of FIG. 7, the designated bandwidth BWforOneNode of the node Node_2 may be used to receive data pieces from the node Node_1. Since the data pieces on the node Node_1 may come from the M servers, Server_1 to Server_M, the data pieces transmitted from the node Node_1 to the node Node_2 may include the data pieces from the M servers, Server_1 to Server_M, which are referred to as data pieces originating from the corresponding servers Server_1 to Server_M, in the context.

In an embodiment, a part of the designated bandwidth BWforOneNode is used specifically for receiving data pieces originating from a given server of the M servers, based on a ratio of the given server's server bandwidth to the M servers' total server bandwidth. The given server may refer to any of the servers, Server_1 to Server_M. In the example of FIG. 7, take the server Server_2 as the given server as an example. The server bandwidth of the server Server_2 is B2, which may be, e.g., 1 GB. The total server bandwidth of the servers, Server_1 to Server_M, is $\Sigma_{k=1}^{M} Bk$, which may be e.g., 10 GB. Then, the ratio of the Server_2's server bandwidth to the M servers' total server bandwidth may be 1/10. In this case, 1/10 of the designated bandwidth BWforOneNode may be used specifically for receiving data pieces originating from the server Server_2.

Since the servers, Server_1 to Server_M, may have different server bandwidths, B1 to BM, and the data on the servers, Server_1 to Server_M, may have different sizes, Z1 to ZM, the servers, Server_1 to Server_M, may finish downloading data to the nodes, Node_1 to Node_N, in sequence. For the sake of simplicity, it is assumed that they finish the downloading in the order from Server_1 to Server_M.

In the case that the N data segments on the server Server_1 are all sent to the nodes, Node_1 to Node_N, for each of the nodes, Node_1 to Node_N, its bandwidth B1/N for receiving data pieces from the server Server_1 may be released. The aforementioned management server may instruct each of the nodes, Node_1 to Node_N, to release its bandwidth B1/N for receiving data pieces from the server Server_1. Therefore, each of the nodes, Node_1 to Node_N, may be able to use the released bandwidth B1/N for inter-node transmission.

In an embodiment, the released bandwidth may be used to receive from other nodes data pieces originating from the remaining servers, Server_2 to Server_M, on which the N data segments have not been completely sent to the N nodes. In an embodiment, the released bandwidth may be used to receive from the other nodes data pieces originating from each of the remaining servers equally. Therefore, for each node, the bandwidth for receiving from the other nodes data pieces originating from any of the remaining servers, Server_2 to Server_M, is increased by $$\frac{B1}{N(M-1)}.$$

In another embodiment, the released bandwidth may be used to receive from the other nodes data pieces originating from each of the remaining servers, based on a ratio of the corresponding server's server bandwidth to the remaining servers' total server bandwidth. Therefore, for each node, the bandwidth for receiving from the other nodes data pieces from the servers Server_i is increased by $$\frac{B1}{N} \times \frac{Bi}{\sum_{k=2}^{M} Bk}.$$

It is appreciated that, in an embodiment, any server's server bandwidth may be less than ½ of the M servers' total server bandwidth. Otherwise, if a server bandwidth higher than ½ of the total server bandwidth is released, the released server bandwidth may not be fully used for inter-node transmission, because the nodes, Node_1 to Node_N, have not received enough data pieces for inter-node transmission.

Further, in the case that the N data segments on the server Server_2 is also completely sent to the nodes, Node_1 to Node_N, for each of the nodes, Node_1 to Node_N, its bandwidth B2/N for receiving data pieces from the server Server_2 may be released. Therefore, each of the nodes, Node_1 to Node_N, may be able to use the released bandwidth B2/N for inter-node transmission.

In an embodiment, for each node, the released bandwidth may be used to receive from other nodes data pieces originating from the remaining servers, Server_3 to Server_M, on which the N data segments have not been completely sent to the N nodes. In an embodiment, the released bandwidth may be used to receive from other nodes data pieces originating from each of the remaining servers equally. Therefore, for each node, the bandwidth for receiving from the other nodes data pieces from any of the remaining servers, Server_3 to Server_M, is increased by $$\sum_{k=2}^{2} \frac{Bk}{N(M-k)}.$$

In another embodiment, the released bandwidth may be used to receive from the other nodes data pieces originating from each of the remaining servers, based on a ratio of the corresponding server's server bandwidth to the remaining servers' total server bandwidth. Therefore, for each node, the bandwidth for receiving from the other nodes data pieces from the servers Server_i is increased by $$\sum_{j=2}^{2} \left( \frac{Bj}{N} \times \frac{Bi}{\sum_{k=j+1}^{M} Bk} \right).$$

After all the servers have sent the data thereon, each of the nodes may use a bandwidth X/(N−1) to transmit data to another node. After a node receives all of the data segments on a server, it may recombine the data segments into one document in its original format, based on any existing or future technique for recombining data segments. The time for every node receiving the data segments on all the servers may be $$\sum_{k=1}^{M} \frac{Zk}{X}.$$

As can be seen from the above, each server's server bandwidth is fully utilized. The time of occupying the servers equals to Max(Z1/B1, Z2/B2, . . . , ZM/BM). By contrast, the time of occupying the servers in the example of FIG. 4 is much higher, which is $$\sum_{k=1}^{M} \frac{Zk}{X}.$$

Therefore, according to the embodiments of the present disclosure, the time of occupying the servers of method 500 is significantly reduced. After the M servers have sent the data thereon, they can be used for other applications.

Under the same inventive concept, another embodiment of the present disclosure can provide a computer program product for distributing data on multiple servers to multiple nodes in a cluster. The computer program product comprises a computer readable storage medium having program instructions embodied therewith. The program instructions are executable by one or more processors to implement the method according to the embodiments of the present disclosure.

The terminology used herein is for the purpose of describing particular aspects of the disclosure only, and is not intended to limit the invention. As used herein and in the appended claims, the singular form of a word includes the plural, and vice versa, unless the context clearly dictates otherwise. Thus, singular words are generally inclusive of the plurals of the respective terms. It should be noted that the word "comprising" or "include" does not necessarily exclude the presence of other elements or steps than those listed.

It should be noted that the processing of distribution from multiple servers to multiple nodes according to embodiments of this disclosure could be implemented by computer system/server 12 of FIG. 1. It should also be noted that, in addition to the cloud system described above, embodiments of the present disclosure can be implemented in any computer and network systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   instructing, by one or more processors, each of M servers to divide data thereon into N data segments, M and N being integers greater than one;
   instructing, by one or more processors, the M servers to send concurrently N×M data segments on the M servers to N nodes in a cluster, wherein for each of the M servers, the N data segments are sent respectively to the N nodes; and
   instructing, by one or more processors, in response to any given node in the cluster receiving a data piece of a data segment from a server of the M servers, the given node to transmit the received data piece to remaining nodes in the cluster other than the given node,
   wherein for each of the remaining nodes, its designated bandwidth for receiving data pieces from the given node is 1/(N−1) of a result of its node bandwidth minus its bandwidth for receiving data pieces from the M servers.

2. The computer-implemented method of claim 1, wherein for each of the M servers, 1/N of its server bandwidth is used for sending one of the N data segments to one of the N nodes.

3. The computer-implemented method of claim 1, wherein a part of the designated bandwidth is used specifically for receiving data pieces originating from a given server of the M servers, based on a ratio of the given server's server bandwidth to the M servers' total server bandwidth.

4. The computer-implemented method of claim 1, further comprising:
   in response to the N data segments on any given server of the M servers being completely sent to the N nodes,
   instructing, by one or more processors, each of the N nodes to release its bandwidth for receiving data pieces from the given server; and
   instructing, by one or more processors, each of the N nodes to use the released bandwidth to receive from other nodes data pieces originating from remaining servers on which the N data segments have not been completely sent to the N nodes.

5. The computer-implemented method of claim 4, wherein the released bandwidth is used to receive from the other nodes data pieces originating from each of the remaining servers equally.

6. The computer-implemented method of claim 4, wherein the released bandwidth is used to receive from the other nodes data pieces originating from each of the remaining servers, based on a ratio of the corresponding server's server bandwidth to the remaining servers' total server bandwidth.

7. The computer-implemented method of claim 1, wherein a server bandwidth of each of the M servers is less than ½ of the M servers' total server bandwidth.

8. The computer-implemented method of claim 1, wherein the node bandwidths of the N nodes have an approximately equal size.

9. The computer-implemented method of claim 1, wherein the N data segments on each of the M servers have an approximately equal size.

10. A system, comprising:
    M servers, M being an integer greater than one;
    N nodes in a cluster, N being an integer greater than one;
    one or more processors coupled to the M servers and the N nodes;
    a memory coupled to the one or more processors; and
    a set of computer program instructions stored in the memory and executed by the one or more processors to implement a method comprising:
      instructing each of the M servers to divide data thereon into N data segments;
      instructing the M servers to send concurrently N×M data segments on the M servers to the N nodes, wherein for each of the M servers, the N data segments are sent respectively to the N nodes; and
      instructing, in response to any given node in the cluster receiving a data piece of a data segment from a server of the M servers, the given node to transmit the received data piece to remaining nodes in the cluster other than the given node,
      wherein for each of the remaining nodes, its designated bandwidth for receiving data pieces from the given node is 1/(N−1) of a result of its node bandwidth minus its bandwidth for receiving data pieces from the M servers.

11. The system of claim 10, wherein for each of the M servers, 1/N of its server bandwidth is used for sending one of the N data segments to one of the N nodes.

12. The system of claim 10, wherein a part of the designated bandwidth is used specifically for receiving data pieces originating from a given server of the M servers, based on a ratio of the given server's server bandwidth to the M servers' total server bandwidth.

13. The system of claim 10, wherein the method executed by the one or more processors further comprises:
    in response to the N data segments on any given server of the M servers being completely sent to the N nodes,
    instructing each of the N nodes to release its bandwidth for receiving data pieces from the given server; and
    instructing each of the N nodes to use the released bandwidth to receive from other nodes data pieces originating from remaining servers on which the N data segments have not been completely sent to the N nodes.

14. The system of claim 13, wherein the released bandwidth is used to receive from the other nodes data pieces originating from each of the remaining servers equally.

15. The system of claim 13, wherein the released bandwidth is used to receive from the other nodes data pieces originating from each of the remaining servers, based on a ratio of the corresponding server's server bandwidth to the remaining servers' total server bandwidth.

16. A computer program product, wherein the computer program product comprises a computer readable storage medium having program instructions embodied therewith, wherein the program instructions are executable by one or more processors to implement a method comprising:
    instructing each of M servers to divide data thereon into N data segments, M and N being integers greater than one;
    instructing the M servers to send concurrently N×M data segments on the M servers to N nodes in a cluster, wherein for each of the M servers, the N data segments are sent respectively to the N nodes;
    instructing, in response to any given node in the cluster receiving a data piece of a data segment from a server of the M servers, the given node to transmit the received data piece to remaining nodes in the cluster other than the given node;
    in response to the N data segments on any given server of the M servers being completely sent to the N nodes,
    instructing each of the N nodes to release its bandwidth for receiving data pieces from the given server; and
    instructing each of the N nodes to use the released bandwidth to receive from other nodes data pieces originating from remaining servers on which the N data segments have not been completely sent to the N nodes.

17. The computer program product of claim 16, wherein for each of the M servers, 1/N of its server bandwidth is used for sending one of the N data segments to one of the N nodes.

18. The computer program product of claim 16, wherein for each of the remaining nodes, its designated bandwidth for receiving data pieces from the given node is 1/(N−1) of a result of its node bandwidth minus its bandwidth for receiving data pieces from the M servers.

19. The computer program product of claim 16, wherein the released bandwidth is used to receive from the other nodes data pieces originating from each of the remaining servers equally.

20. The computer program product of claim 16, wherein the released bandwidth is used to receive from the other nodes data pieces originating from each of the remaining servers, based on a ratio of the corresponding server's server bandwidth to the remaining servers' total server bandwidth.

* * * * *